United States Patent

Wenzel et al.

[11] Patent Number: 5,850,907
[45] Date of Patent: Dec. 22, 1998

[54] GUIDE TRACK FOR ROLLER CHAIN DRIVES

[75] Inventors: Jurgen Wenzel, Hainburg; Harald Wolski, Rodgau, both of Germany

[73] Assignee: MAN Roland Druckmaschinen AG, Germany

[21] Appl. No.: 521,840

[22] Filed: Aug. 31, 1995

[30] Foreign Application Priority Data

Sep. 3, 1994 [DE] Germany .......................... 44 31 492.2

[51] Int. Cl.[6] .................................................. B65G 15/60
[52] U.S. Cl. ...................... 198/838; 198/837; 198/860.1; 198/860.2; 198/735.2
[58] Field of Search .................................... 198/837, 838, 198/860.1, 860.2, 735.2, 735.6, 733

[56] References Cited

U.S. PATENT DOCUMENTS

| | | | |
|---|---|---|---|
| 1,917,134 | 7/1933 | Levin | 198/733 |
| 2,450,501 | 10/1948 | Clarkson | 198/733 |
| 2,761,548 | 9/1956 | Long | 198/733 |
| 2,856,061 | 10/1958 | Seigle et al. | 198/733 |
| 4,144,965 | 3/1979 | Alldredge et al. | 198/838 |
| 4,541,525 | 9/1985 | Braun et al. | 198/735.2 |
| 5,156,258 | 10/1992 | Steinkuhl et al. | 198/735.6 |

FOREIGN PATENT DOCUMENTS

AS 2 246 061 10/1973 Germany .
G 93 20 257.1 4/1994 Germany .

*Primary Examiner*—William E. Terrell
*Assistant Examiner*—Khoi H. Tran
*Attorney, Agent, or Firm*—Leydig, Voit & Mayer, Ltd.

[57] ABSTRACT

A guide track for use with a chain drive having roller chains is provided with a plurality of components assembled in end-to-end relation. The transition joints between the individual components are characterized by the component arranged upstream in the running direction of the chain drive having a substantially concave end face and the component arranged downstream in the running direction of the chain drive having a mating substantially concave end face thereby providing a substantially chatter-free junction.

3 Claims, 4 Drawing Sheets

GUIDE TRACK FOR ROLLER CHAIN DRIVES

FIELD OF THE INVENTION

The invention relates generally to printing machines, and more specifically to a guide track for a roller chain drive in a printing machine.

BACKGROUND OF THE INVENTION

Typically, roller chain drives which are supported by a guide track are used for various applications in a sheet-processing rotary printing machine. Roller chain drives are used in delivery units and in intermediate systems between printing units and further processing units such as varnishing works. In addition, a printing machine can be equipped with a roller chain drive that runs endlessly throughout the entire machine.

A guide track of this type is known from DE-G 9 320 257.1, in which the track has openings that are arranged in the conveying direction with a defined spacing from one another and that pass through the thickness of the track. In a further development, the openings also run through the basic body which supports the guide track and are connected as a fastening part to the adjacent machine frame. These openings, which are preferably designed as slots, are intended to prevent the accumulation of paper dust and ink residue by allowing the dust and residue to be continuously conveyed out of the guide track. The prevention of an accumulation of paper dust and ink residues allows the roller chain to run smoother and with less wear. However, these slots influence the running of the roller chain because they are in the running surface of the chain rollers. Each time the chain rollers run over a slot a jolt occurs which increases the vibration of the roller chain. This vibration is particularly pronounced when the chain drive is running at high conveying speeds.

It is also known in printing machine construction and, in particular, in the design of guide tracks on both the drive side and operating side of the machine that the guide track is comprised of a series of individual components joined together in end-to-end relation. At the transition between the individual components there are joints which influence the running of the chain rollers. Like the slots in DE-G 9 320 257.1, these transition joints cause undesirable chain vibration which leads to increased running noise and enhanced wear of the chain drive. In addition, this vibration can have an adverse impact on the modules in the printing machine that are adjacent to the chain drive.

One solution to reducing the jolting and chattering is to design the transition joints so that when they are viewed from above the running surface of the guide track the transition joints between the individual components either run obliquely or are recessed overlappingly at a right angle. While this design reduces jolting and chattering it is only suitable for one side of the chain drive and therefore its use requires a wide variety of parts.

OBJECTS AND SUMMARY OF THE INVENTION

It is an object of the invention to provide a guide track for supporting a roller chain that has transition joints which cause appreciably less vibration of the chain drive.

It is a related object of the invention to provide a guide track that can be used on both sides of the chain drive thereby reducing the number of different parts required for the guide track.

In accordance with these and other objects of the invention a guide track is provided for use in chain drives in printing machines. The guide track has transitions between components that reduce vibration of the chain drive, dynamic loading of the chain drive, and the number of transitions necessary for a typical guide track. The guide track reduces the vibration and dynamic loading by reducing the jolting and chattering of the chain rollers in the guide track. This is achieved by providing transitions where the bearing portion of the chain roller always extends from approximately the center of the running surface to the side edges. The reduction in vibration and dynamic loading allows the chain drive to run more quietly and with reduced wear. Further, the reduction in vibration and dynamic loading of the chain drive reduces the impact that the chain drive has on adjacent modules within the printing machine.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
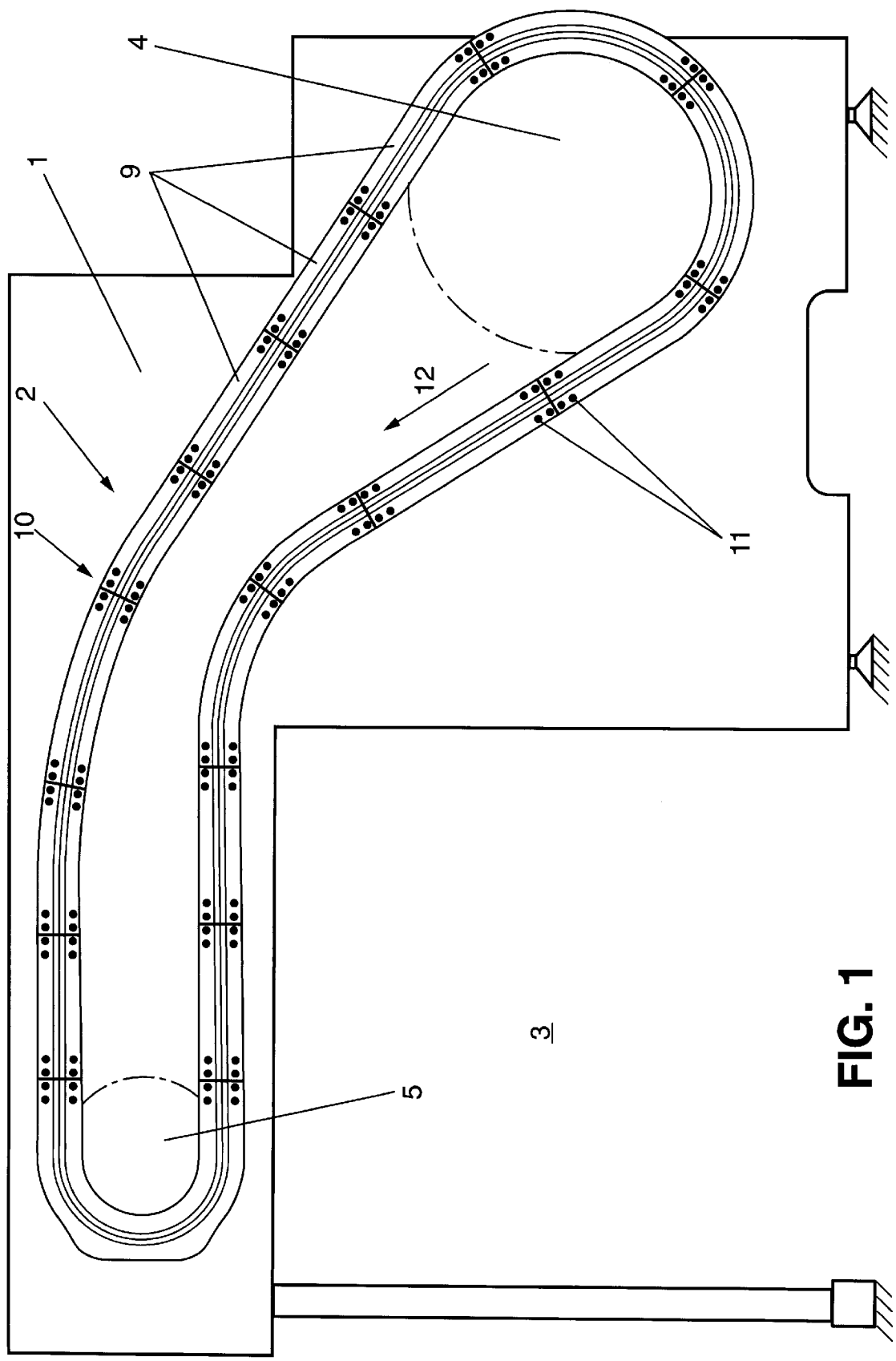
FIG. 1 is a diagrammatic side view of the guide track of the present invention.

FIG. 1 illustrates in schematic form a delivery unit which is part of a rotary printing machine that is located downstream of a printing unit or a further-processing unit in the sheet running direction. A delivery unit typically comprises a side stand or frame 1 which is arranged on both the drive side and the operating side, a delivery drum 4 with drive sprockets, and a return sprocket 5 on each side above a pile region 3. An endless chain drive is guided in a guide track 2, which in this case comprises upper and lower guide track 2a, 2b, for movement around the delivery drum 4 sprockets and the return sprockets 5. One guide track is in each case releasably fixed via attachment points 11 to spacers which are attached to the side stand or frame 1. The spacers support the upper and lower guide tracks 2a, 2b between which the chain rollers 13 of the chain drive run. While the illustrated embodiment is a delivery unit, it is understood that the guide track can be used at any point in a printing machine where a chain drive is used including in intermediate systems between two printing units or between printing units and further-processing units, such as varnishing works.

Figure 2:
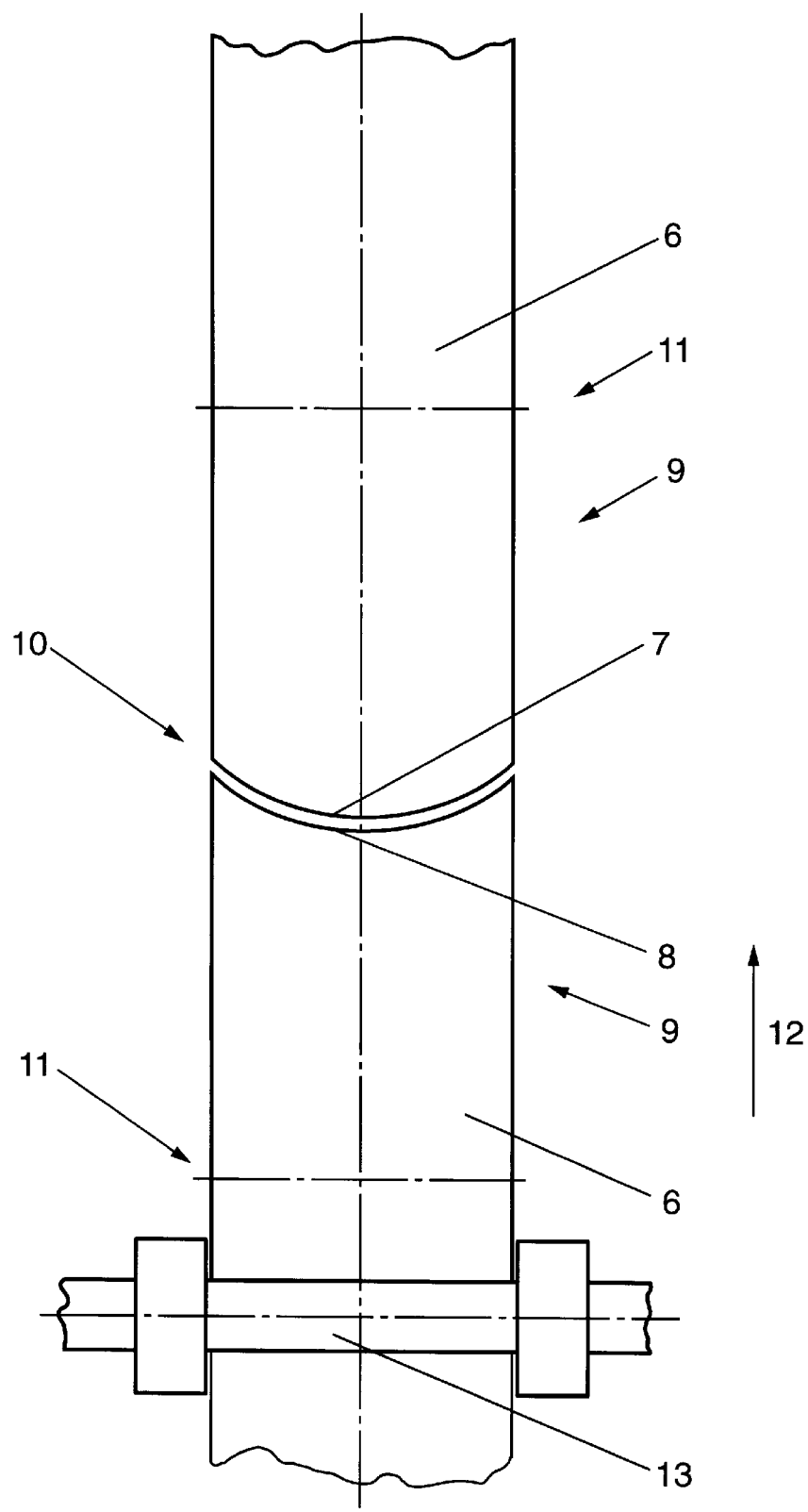
FIG. 2 is a plan view of the running surface of the guide track showing the transition joint between components of the guide track.

Each guide track 2a, 2b is composed of a plurality of flush components 9 disposed in end-to-end relation which define a respective guide surface. At the transition joints 10 formed by the individual components 9, each component 9 arranged upstream in the running direction 12 of the chain drive has a substantially concave end face 8, and the component arranged downstream respectively in the running direction 12 has a substantially convex end face 7 (FIG. 2). The end faces 7, 8 are formed with mating end faces such that the gap in the transition joint 10 is small, although it is shown with a substantial space in FIG. 2.

Figure 3:
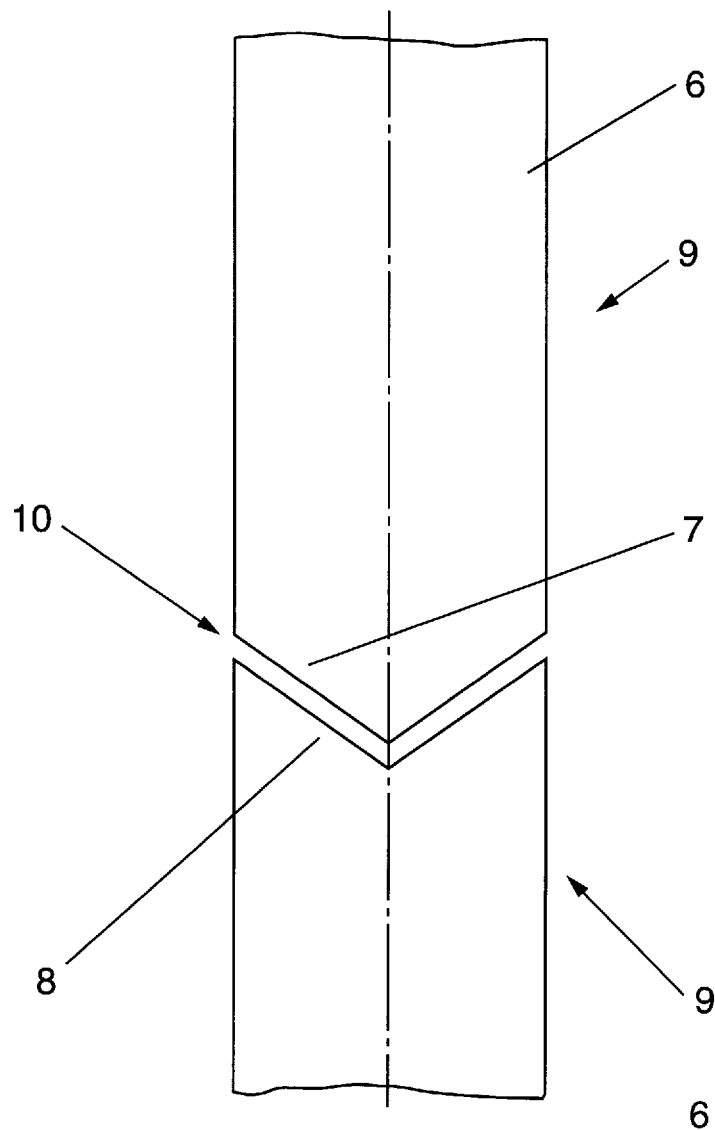
FIG. 3 is a plan view of the running surface of the guide track showing an alternative embodiment of the transition joint between components of the guide track.
Figure 4:
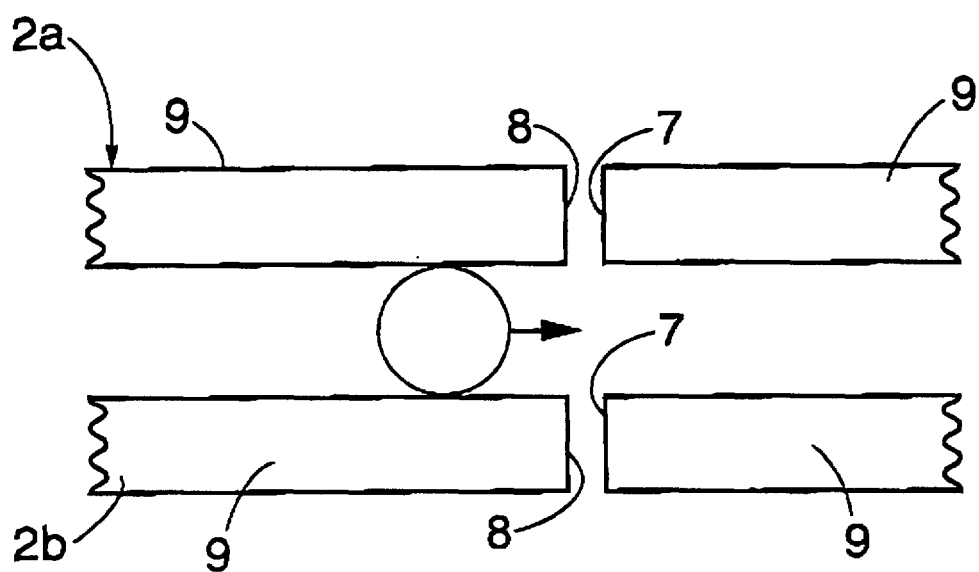
FIG. 4 is an enlarged fragmentary vertical section of the illustrated guide track, taken in the plane of line 4—4 in FIG. 2.

FIG. 3 shows an alternative embodiment of the transition joint 10 between the individual components forming the guide track. As depicted in FIG. 3, at the transition joint between the individual components the upstream component has a concave shape end face 8 formed by a pair of straight sides in the form of a V and the downstream component has a concave shaped end face 7 formed by a pair of straight sides in the form of a V complementary in shape to the end face 8. It is preferred that the transition joint has a symmetrical design thus guaranteeing the exchangeability of parts between the drive side and operating side of the printing machine. In addition, the symmetrical arrangement allows for a continuous transition of the bearing portions of the chain rollers 13.

The mode of operation is as follows: A sheet is taken from an upstream module of a printing machine by means of a delivery drum 4 and gripper systems (not shown). The sheet is then conveyed via the chain drive to a pile region 3 where the sheet is delivered. The chain drive then runs over the return sprockets 5 back to the delivery drum 4. The chain rollers 13 of the chain drive run in the running direction 12 in the running surface of the individual components 9 of the guide track 2. When a chain roller 13 comes upon a transition joint 10 between the individual components 9 the central portion of the chain roller leaves the concave end face 8 of the upstream component and reaches the convex end face 7 of the next component downstream first. At this point, the outer edges of the chain roller are still resting on the upstream component. As the chain roller continues to move in the running direction the portion of the chain roller bearing on the downstream component constantly increases beginning at the center of the convex end face 7, while the portion of the chain roller bearing on the outer edges of the concave end face 8 of the upstream component constantly decreases. Thus, the guide track 2 reduces the jolting and chattering of the chain rollers at the transition joints thereby reducing the vibration and dynamic loading of the chain drive. This allows the chain drive to run more quietly and with reduced wear.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

I claim as my invention:

1. A printing machine sheet delivery unit comprising:

a sheet transfer chain for releasably receiving and transferring sheets, said chain including a plurality of laterally spaced rollers moveable in an endless path in a running direction, a pair of guide tracks each having a plurality of components mounted, said components of each track having a substantially flat running surface disposed in spaced parallel relation to a flat running surface of a component of the opposite track for guiding movement of the chain rollers between the tracks, said components each having upstream and downstream ends disposed in closely spaced apart relation to each other to form gaps in the flat running surfaces of the components which guide movements of the chain rollers, and said upstream and downstream ends of said components of each track having mating substantially concave and convex end faces respectively in relation to the running direction of the chain for defining a substantially chatter free transition joint between respective flat running surfaces of the components without any portions of said concave and convex end faces being overlying relation to each other.

2. A printing machine sheet delivery unit as defined in claim 1 wherein each of said upstream end faces is concave in shape and each of said downstream faces is convex in shape.

3. A printing machine sheet delivery unit as defined in claim 2 in which said concave and convex shaped end faces each are defined by a pair of straight sides in the form of a V.

* * * * *